United States Patent
Naruse et al.

(10) Patent No.: US 6,370,966 B1
(45) Date of Patent: Apr. 16, 2002

(54) INPUT TORQUE DETECTOR FOR POWER STEERING

(75) Inventors: Nobuharu Naruse; Naomichi Tanigawa; Fusayoshi Kugiyama, all of Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,249

(22) PCT Filed: Jan. 29, 1997

(86) PCT No.: PCT/JP97/00202

§ 371 Date: Sep. 15, 1999

§ 102(e) Date: Sep. 15, 1999

(87) PCT Pub. No.: WO98/32644

PCT Pub. Date: Jul. 30, 1998

(51) Int. Cl.⁷ .................................................. G01L 3/00
(52) U.S. Cl. .................................................... 73/862.08
(58) Field of Search ......... 73/862.08, 862.333–862.336

(56) References Cited

U.S. PATENT DOCUMENTS

| 4,509,375 A | * | 4/1985 | Davis ..................... 73/862.32 |
| 5,578,767 A | * | 11/1996 | Chikaraishi et al. ... 73/862.331 |
| 5,739,616 A | * | 4/1998 | Chikaraishi et al. ........ 310/194 |
| 5,796,014 A | * | 8/1998 | Chikaraishi et al. ... 73/862.331 |
| 5,811,695 A | * | 9/1998 | Satoh et al. ........... 73/862.331 |

FOREIGN PATENT DOCUMENTS

| JP | 2-256561 | | 10/1990 | |
| JP | 3-86881 | * | 9/1991 | .............. 73/862.08 |
| JP | 5-124522 | | 5/1993 | |
| JP | 7-182151 | | 7/1995 | |

OTHER PUBLICATIONS

"Mechanical Engineering Handbook Application edit B1 Mechanical Element Design Toribology" by The Japan Soc. of Mechanical Engineers, Jul. 3, 1985, pp. 172–173.

* cited by examiner

Primary Examiner—Benjamin R. Fuller
Assistant Examiner—Jewell V. Thompson
(74) Attorney, Agent, or Firm—Rabin & Berdo, P.C.

(57) ABSTRACT

There is provided an input torque detecting device, in power steering, which converts a relative rotation of an input shaft and an output shaft into a movement in a direction of a shaft so as to detect torque. The input shaft 1 and the output shaft 3 are connected via a torsion bar 2 and also a sleeve 7 is installed at a common outer circumference of the input shaft 1 and the output shaft 3. The sleeve is connected to the input shaft 1 through helical splines 8a and 8b which extend in a direction diagonal to a shaft line and connected to the output shaft 3 through straight splines 9a and 9b which extend in a direction of a shaft line, respectively. Torsion of the torsion bar 2 based on input torque is detected as an amount of slide of the sleeve in a direction of a shaft line to be determined by the helical splines 8a and 8b. By applying splines to a section of engaging the input shaft 1 and the output shaft 3 with the sleeve 7, manufacturing costs can be curtailed and also durability of the engaging section can be improved.

9 Claims, 7 Drawing Sheets

INPUT TORQUE DETECTOR FOR POWER STEERING

TECHNICAL FIELD

The present invention relates to an input torque detecting device for power steering, more particularly, an input torque detecting device which converts a relative rotation of an input shaft and an output shaft into a movement in the direction of a shaft so as to detect torque.

BACKGROUND ART

Heretofore, as an input torque detecting device for power steering, for example, a device for detecting input torque by converting the relative rotation of an input shaft and an output shaft resulting from torsion of a torsion bar based on input torque into an amount of slide in the direction of a shaft and detecting the amount of slide as proposed in Japanese Patent Application No. Hei 7-182151 is well known. The input torque detecting device of Japanese Patent Application No. Hei 7-182151 will subsequently be described with reference to FIGS. 6 through 9.

As shown in FIG. 6, an input shaft 101 in which torque is input from a steering wheel is rotatably held in a gear box 118 through a bearing 121 and also connected to an output shaft 103 through a torsion bar 102 which is connected to the inside of the input shaft 101. The output shaft 103 is rotatably held in the gear box 118 through a bearing 122 and also engaged with a rack shaft 105 through a pinion gear 104, whereby input torque is applied to a steered side through the rack shaft 105.

A cylindrical sleeve 107 is installed at a common outer circumference of the input shaft 101 and the output shaft 103. As shown in FIG. 7, at an inner circumference of the sleeve 107, a pair of pins 108 are installed as members for engaging with the input shaft 101 at an interval of 180 degrees and also a pair of shaft line direction holes 109 which extend in the direction of a shaft line are formed as members for engaging with the output shaft 103 at an interval of 180 degrees. Incidentally, the pins 108 and the shaft line direction holes 109 are installed in such a manner that they get out of position to each other by 90 degrees.

On the other hand, as shown in FIGS. 8 and 9, two spiral grooves 113 which extend in a direction diagonal to a shaft line are formed at an outer circumference of the input shaft 101 as sections for engaging with the pins 108. Further, pins 114 are formed at the output shaft 103 as members for engaging with the shaft line direction holes 109.

Further, an annular detection groove 115 is formed at an outer circumference of the sleeve 107 and a detection lever 116 of a sensor 117 (for example, a potentiometer) is engaged with the detection groove 115.

Due to such constitution, in a conventional input torque detecting device, the input shaft 101 and the output shaft 103 make relative rotations as a result of torsion of a torsion bar which is caused by inputting input torque from a steering wheel in the input shaft 101. At this time, in a relation to the output shaft 103, the sleeve 107 is allowed to make a relative movement only in a direction along the shaft line direction holes 109 and is prohibited from making a relative rotation. On the other hand, in a relation to the input shaft 101, the sleeve 107 makes relative rotations sliding in the direction of a shaft in spiral orbit along the spiral grooves 113. Thus, an amount of torsion of the torsion bar 102 is converted into an amount of slide of the sleeve 107, and the amount of slide is detected by the sensor 117 as an amount of operating the detection lever 116 which is engaged with the sleeve 107. More specifically, input torque is detected by the sensor 117, and an electric motor or the like which is not shown in the drawings generates auxiliary torque according to the magnitude and direction of the input torque detected.

However, the conventional input torque detecting device is accompanied with the following problems.

First, the conventional input torque detecting device requires that the pins 108 are fitted to the sleeve 107 and the pins 114 to the output shaft 103, respectively, as engaging members, whereby a large number of parts are used. Further, it requires a process which pin holes for fixing pins are machined in the sleeve 107 and the output shaft 103 and then the pins 108 and 114 are pressed into the pin holes. Surplus manufacturing costs are entailed and man-hours for assembly increase.

Second, due to line contact of the spiral grooves 113 with the cylindrical pins 108 and the shaft line direction holes 109 with the cylindrical pins 114, operation of the device easily causes abrasion of these pins 108 and 114.

Third, since the spiral grooves 113 formed at the input shaft 103 are square, plastic working cannot be carried out and machining is required, whereby manufacturing costs become higher.

In this regard, Japanese Patent Application No. Hei 7-182151 discloses an embodiment in which a ball rotatably held at the sleeve 107 is used as an engaging member, but it does not lead to the fundamental solution of the problems described above. Further, in order to prevent the ball from falling from the sleeve 107, a ball hole must be bored in the sleeve 107, whereby manufacturing costs are increased again.

The present invention is made in consideration of such problems. An object of the present invention is to provide an input torque detecting device for power steering which is capable of reducing parts in number, facilitating assembly, and decreasing manufacturing costs.

DISCLOSURE OF THE INVENTION

According to the present invention, in an input torque detecting device comprising an input shaft in which torque is input from a steering wheel side, an output shaft being linked to a steered side, a torsion bar to be equipped between the said input shaft and output shaft, a movable body which is slidably arranged at the said input shaft and output shaft in the direction of a shaft, converting means for converting a relative rotation of the said input shaft and output shaft into a slide of the movable body in the direction of a shaft, and detecting means for detecting an amount of slide of the movable bodies, a cylindrical sleeve to be arranged as the said movable body at a common outer circumference of the said input shaft and output shaft is equipped and also a diameter expansion section is installed at any one of the outer circumferences of the said input shaft and output shaft. Further, the said converting means have a plurality of splines which are formed extending in a direction diagonally to a shaft line at the said diameter expansion section and an inner circumference of the said sleeve, respectively, and engagement means which engage either of the input shaft or the output shaft with the said sleeve in such a manner that only a slide in the direction of a shaft is allowed. At least one end of the said splines is opened, an undulation section is installed orthogonally to a shaft center at an outer circumference of the said sleeve, and a detection lever of the detecting means is engaged with the undulation section. Thus, when a relative rotation between the input shaft and the output shaft arises resulting from torsion of the torsion bar based on input torque, in a relation to the input shaft or the output shaft, the sleeve makes relative rotations along a spiral orbit which is determined by a plurality of splines formed extending in a diagonal direction and also makes a relative movement in the direction of a shaft. Input torque is detected by detecting an amount of slide of the sleeve in the direction of a shaft by the detecting means. When auxiliary torque arises based on the magnitude and direction of the input torque, an appropriate power assist can be achieved. In this case, a section engaging the sleeve with the input shaft or the output shaft is composed of a plurality of splines. These splines can be formed in one united body with the sleeve and either the input shaft or the output shaft. Thus any other engaging member of a different kind is not required, whereby the number of parts and the man-hours for assembly in manufacturing can be decreased and costs can be reduced. Further, since spline connection is applied to the sleeve and either the input shaft or the output shaft by a plurality of splines, a contact area of the engaging section can be increased. This leads to a decrease in contact pressure. As a result, abrasion of the engaging section can be reduced, and durability and reliability of the input torque detecting device can be improved. Further, as the plurality of splines can easily be processed, time and labor for machining can be curtailed, and manufacturing costs can be decreased. Also, the undulation section which is a section of engaging the sleeve with the detection lever can easily be processed, whereby manufacturing costs can be decreased. Further, a distance between the detecting means and the sleeve can be shortened by adjusting the size of the diameter expansion section. Therefore, length of the detection lever can be shortened, detection accuracy of the detecting means can be improved, and operation of the sleeve can be improved.

Further, according to the present invention, means for engaging the sleeve with either of the said input shaft and output shaft is a pair of splines which are formed at an outer circumference of either the input shaft or the output shaft and at an inner circumference of the sleeve, respectively, at an interval of 180 degrees extending in the direction of a shaft line. Due to this arrangement, the linear splines can be formed in one united body with the sleeve and either the input shaft or the output shaft. Thus, the number of parts and the man-hours for assembly can be reduced, the pair of splines extending in the direction of a shaft line can easily be processed, and the manufacturing costs can be decreased. Also, due to spline connection by means of the pair of splines extending in the direction of a shaft line, a contact area of the engaging section can be increased, abrasion of the engaging section can be reduced, and durability of the device improves.

Further, according to the present invention, a plurality of slanting splines to be formed at either the input shaft or the output shaft are formed at the diameter expansion section which is installed at an outer circumference of either the input shaft or the output shaft, and at least one end of these splines is opened. Thus, the plurality of slanting splines can easily be processed.

Further, according to the present invention, a pair of splines facing in the direction of a shaft line to be formed at either the input shaft or the output shaft are formed at a diameter expansion section which is installed at an outer circumference of either the input shaft or the output shaft, and at least one end of these splines is opened. Thus, the pair of splines facing in the direction of a shaft line can easily be processed.

BEST MODE FOR CARRYING OUT THE INVENTION

In order to give a detailed description of the present invention, it will be described with reference to the accompanying drawings.

Figure 1:
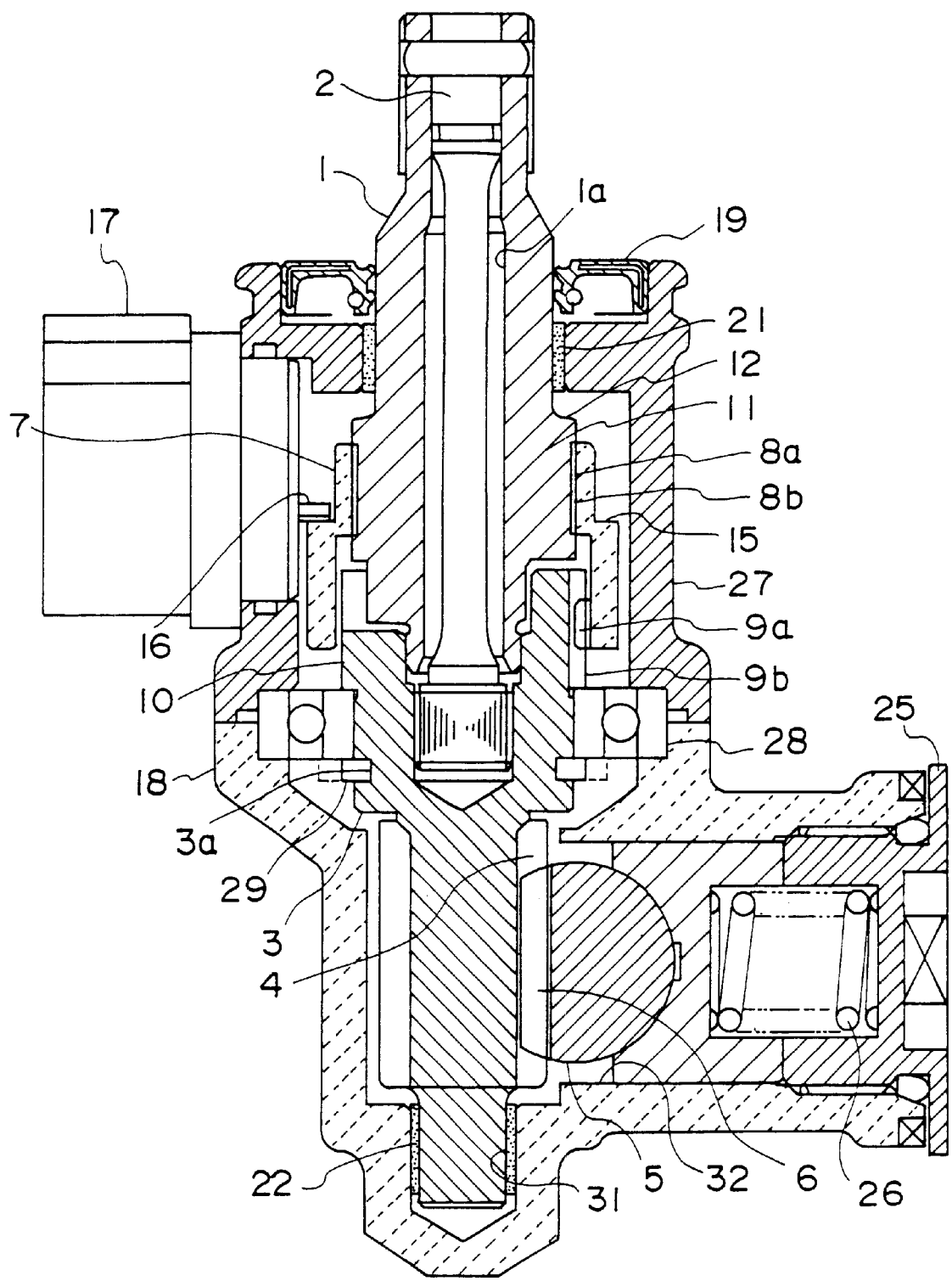
FIG. 1 is a sectional drawing of the input torque detecting device according to the present invention.

FIG. 1 is a sectional drawing of the input torque detecting device according to the present invention.

As shown in the drawing, an input shaft 1 in which torque is input from the steering wheel side has a hollow section 1*a* extending in a direction along the shaft, and a torsion bar 2 is installed in the hollow section 1*a*. And, it is arranged such that the input shaft 1 and an output shaft 3 are connected in a coaxial form via the torsion bar 2, and the input shaft 1 and the output shaft 3 makes relative rotations by an amount equivalent to torsion of the torsion bar 2. The output shaft 3 has a pinion gear 4 at its outer circumference, and the pinion gear 4 is engaged with a rack gear 6 of a rack shaft 5. The rack shaft 5 is linked to a steered side.

Figure 2:
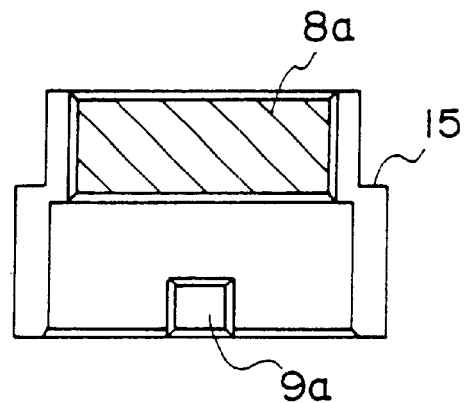
FIG. 2 is a sectional drawing of a sleeve of the input torque detecting device according to the present invention.

A cylindrical sleeve 7 is installed at a common outer circumference of the input shaft 1 and the output shaft 3. As shown in FIG. 2, on the input shaft 1 side of an inner circumference of the sleeve 7, a plurality of helical splines 8*a* (male type in this embodiment) extending in a direction diagonal to the shaft line are formed at the entire inner circumference of the sleeve 7. Further, on the output shaft 3 side of an inner circumference of the sleeve 7, a pair of straight splines 9*a* (male type in this embodiment) is formed at an interval of 180 degrees.

Figure 3:
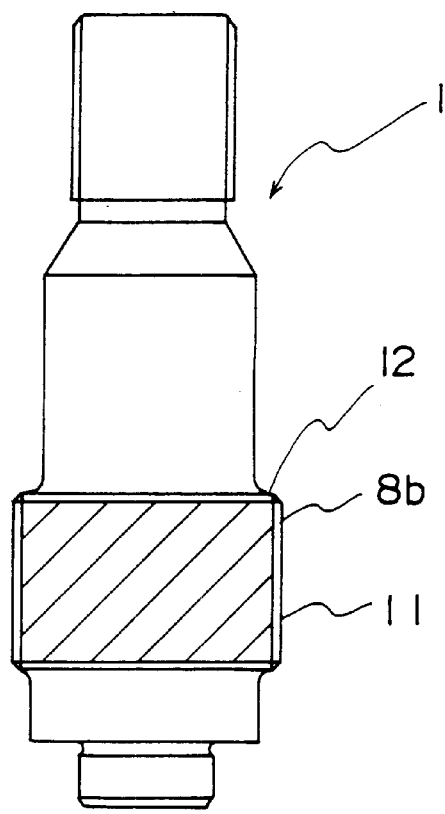
FIG. 3 is a sectional drawing of an input shaft of the input torque detecting device according to the present invention.

On the other hand, as shown in FIG. 3, a diameter expansion section 11 is formed at an outer circumference of the input shaft 1, and undulations comprising a rectangular corner 12 are formed at both ends of the diameter expansion section 11. And, a plurality of helical splines 8*b* (female type in this embodiment) is formed in a direction diagonal to the shaft line at the diameter expansion section 11. In this case, due to the effect of installation of the helical splines 8*b* at the diameter expansion section 11, both ends of the helical splines 8*b* are opened. By engaging helical splines 8*b* on the input shaft 1 side with helical splines 8*a* on the sleeve 7 side, the input shaft 1 and the sleeve 7 are connected.

Figure 4:
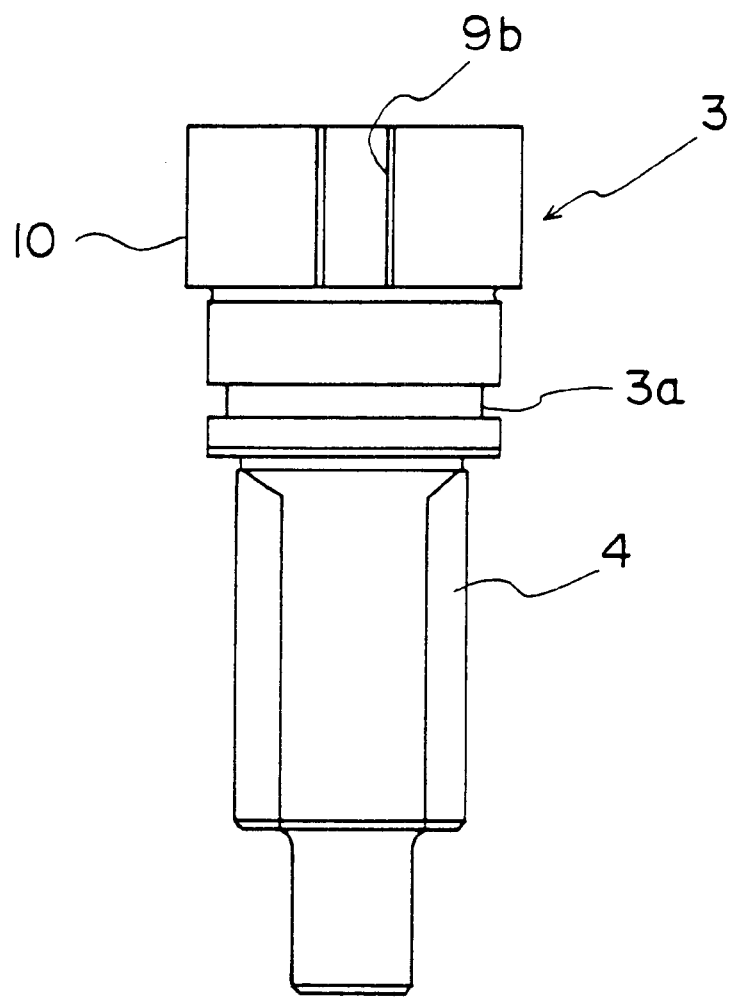
FIG. 4 is a sectional drawing of an output shaft of the input torque detecting device according to the present invention.

Further, as shown in FIG. 4, a diameter expansion section 10 is formed at an end of the input shaft 1 side of an outer circumference of the output shaft 3, and a pair of straight splines 9b (female type in this embodiment) extending in a direction of the shaft line of the output shaft 3 are formed at an outer circumference of the diameter expansion section 10 at an interval of 180 degrees. Due to the effect of installation of the straight splines 9b at the diameter expansion section 10, both ends of the straight splines 9b are opened. These straight splines 9b are engaged with a pair of straight splines 9a on the sleeve 7 side, respectively.

Incidentally, in this embodiment, both ends of the helical splines 8b and the straight splines 9b are opened, but it is also possible to open only one end without opening both ends like this.

Thus, the output shaft 3 and the sleeve 7 are allowed only to slide in the direction of a shaft line along the straight splines 9a and 9b and the relative rotation is prohibited. On the other hand, the input shaft 1 and the sleeve 7 are arranged to slide in the direction of a shaft line making relative rotations in spiral orbit along the helical splines 8a and 8b. More specifically, it is arranged such that correspondingly to the relative rotation of the input shaft 1 and the output shaft 3, the sleeve 7 slides, in the direction of a shaft line, to a length which is determined based on the inclination of the helical splines 8a and 8b.

Further, as shown in FIG. 1 and FIG. 2, an undulation section 15 is installed at an outer circumference of the sleeve 7, and a detection lever 16 of a sensor 17 (for example, a potentiometer) is engaged with the undulation section 15. Thus, the detection lever 16 is operated by an amount of slide of the sleeve 7 which is converted from an amount of torsion of the torsion bar 2 (an amount of relative rotations of the input shaft 1 and the output shaft 3), and the amount of torsion of the torsion bar 2 is detected by the sensor 17. The magnitude and direction of input torque can be found out from the amount of torsion of the torsion bar 2 thus detected. Therefore, according to the magnitude and the direction of the input torque, an electric motor or the like which is not shown in the drawings generates auxiliary torque on the steered side, whereby an appropriate power assist is performed.

Incidentally, a section which is formed at the sleeve 7 for engaging with the detection lever 16 is not restricted to undulations like the case of the undulation section 15. It will be also sufficient if, for example, a groove (for example, an annular groove) engaged with the detection lever 16 is formed at an outer circumference of the sleeve 7 and used as an engaging section.

Incidentally, the input shaft 1 is housed in an input shaft case 27 as shown in FIG. 1, and the sensor 17 is fixed to a side of the input shaft case 27. To be more precise, the input shaft 1 is rotatably held through a bearing 21 on the opening end side of the input shaft case 27. Also the input shaft 1 projects from the opening end and it is connected on a steering wheel side which is not shown in the drawings. The opening end is sealed by an oil seal 19.

On the other hand, the output shaft 3 is rotatably held in a gear box 18 through a bearing 28 on the input shaft 1 side rather than on the pinion gear 4 side. Further, a calking ring 29 is installed at an annular groove 3a which is formed at an outer circumference of the output shaft 3, and the bearing 28 is held between the calking ring 29 and an end of the input shaft case 27. Further, an end of the output shaft 3 which is on the opposite side to the input shaft 1 of the output shaft 3 is inserted into an engagement hole 31 which is formed at the bottom of the gear box 18, and the end is held in the engagement hole 31 through a bearing 22. Further, the gear box 18 has a housing section 32 of the rack shaft 5 at a side of the output shaft, and the rack shaft 5 is urged to the output shaft 3 side by a spring 26 installed between a plug 25 for sealing the housing section 32 and the rack shaft 5 so as to improve the engagement of the pinion gear 4 with the rack gear 6.

Operation will subsequently be described.

When torque is input in the input shaft 1, torsion is applied to the torsion bar 2 and a relative rotation arises between the input shaft 1 and the output shaft 3. At this time, correspondingly to the output shaft 3, the sleeve 7 arranged at a common outer circumference of the input shaft 1 and the output shaft 3 is allowed only to slide in the direction of a shaft line by the straight splines 9a and 9b. On the other hand, correspondingly to the input shaft 1, the sleeve 7 makes relative rotations along a spiral orbit of the helical splines 8a and 8b and at the same time it slides in the direction of a shaft by an amount which is in proportion to the relative rotations. Thus, the relative rotation of the input shaft 1 and the output shaft 3 is converted into the amount of slide of the sleeve 7. Since the detection lever 16 of the sensor 17 is engaged with the undulation section 15 of the sleeve 7, the detection lever 16 is operated by an amount of slide of the sleeve 7 from the initial state. As a result, an amount of torsion of the torsion bar 2, namely, input torque is finally detected by the sensor 17. According to the magnitude and direction of the input torque thus detected, an electric motor or the like which is not shown in the drawings applies auxiliary torque to the steered side, whereby an appropriate power assist is achieved in power steering.

As described above, in the input torque detecting device according to the present invention, sections of engaging the input shaft 1 and the output shaft 3 with the sleeve 7 are the helical splines 8a and 8b and the straight splines 9a and 9b, respectively, and these splines are formed in one united body with the input shaft 1, the output shaft 3, and the sleeve 7, respectively. Thus, other engaging members of different kind are not required particularly, whereby the number of parts and man-hours for assembly in manufacturing can be decreased and costs can be reduced.

Further, a spline connection is provided on the input shaft 1, the output shaft 3, and the sleeve 7, and in particular the input shaft 1 side is engaged with the sleeve 7 side through the plurality of helical splines 8a and 8b. Thus, a contact area of the engaging section can be increased and the wear of the section of engaging the sleeve 7 with the input shaft 1 and the output shaft 3 can be decreased resulting from a decrease in contact pressure, whereby the durability and reliability of the input torque detecting device can be improved.

Further, the plurality of helical splines 8a provided at an outer circumference of the input shaft 1 do not have to be square, whereby plastic working can be carried out. Also, die forming can be applied to the helical splines 8b and the straight splines 9b at an inner circumference of the sleeve 7 and the undulation section 15 at an outer circumference of the sleeve 7. Therefore, time and labor for machining the sleeve 7 and the engaging section of the input shaft 1 can be reduced and manufacturing costs can be reduced.

In particular, if the helical splines 8b are formed at the diameter expansion section 11 which is provided at an outer circumference of the input shaft 1 and the straight splines 9b are formed at the diameter expansion section 10 which is provided at an outer circumference of the output shaft 3, respectively, at least one end of the helical splines 8b and the straight splines 9b can be formed to be opened. Thus, processing of these splines will be facilitated.

Furthermore, according to the embodiment described above, the helical splines 8a and 8b are installed on the input shaft 1 side and the straight splines 9a and 9b on the output shaft 3 side. However, it is also possible to have such constitution that as opposed to the above, the straight splines are installed on the input shaft 1 side and the helical splines on the output shaft 3 side.

Figure 5:
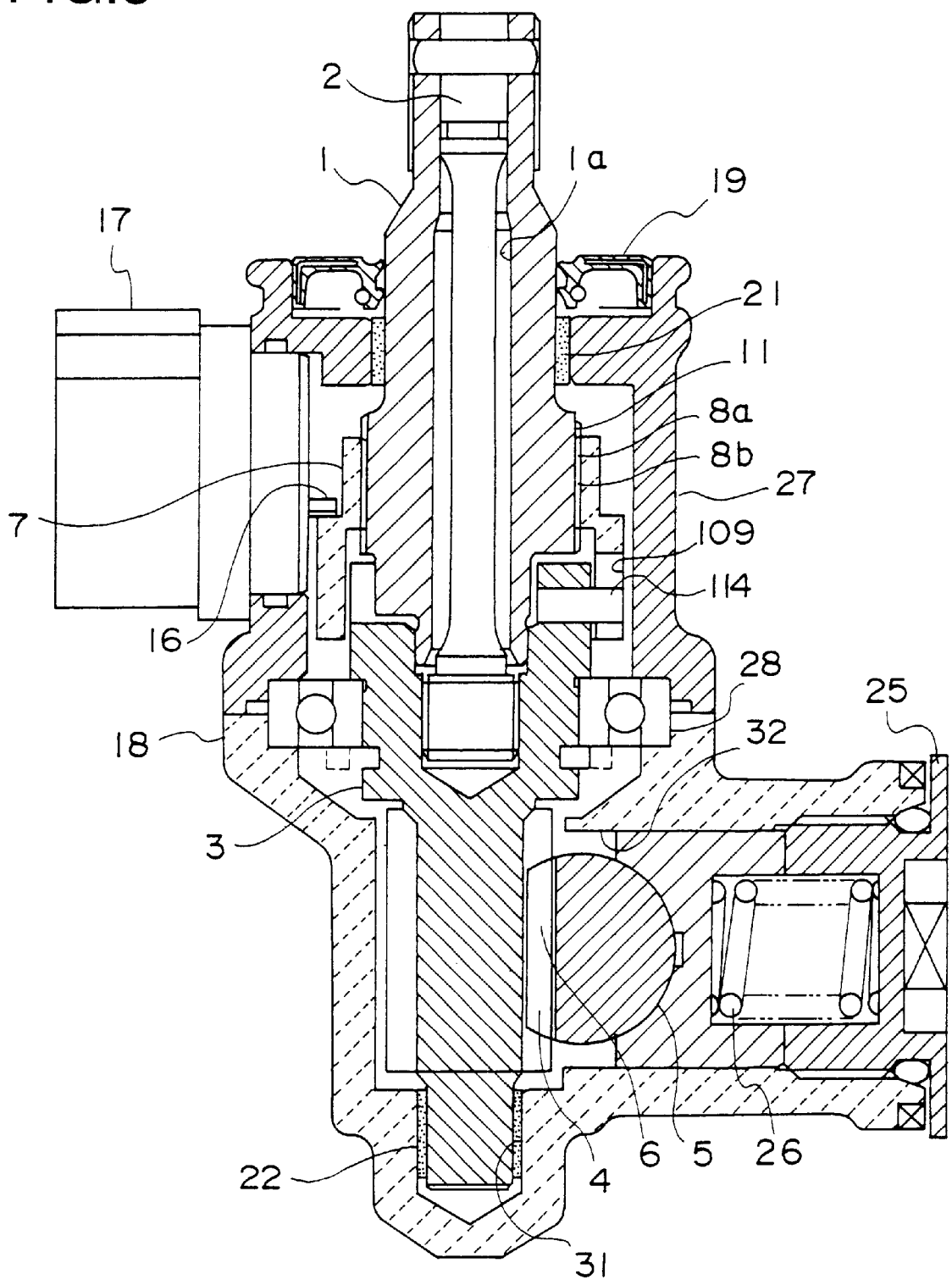
FIG. 5 is a sectional drawing of another embodiment of the input torque detecting device according to the present invention.
Figure 6:
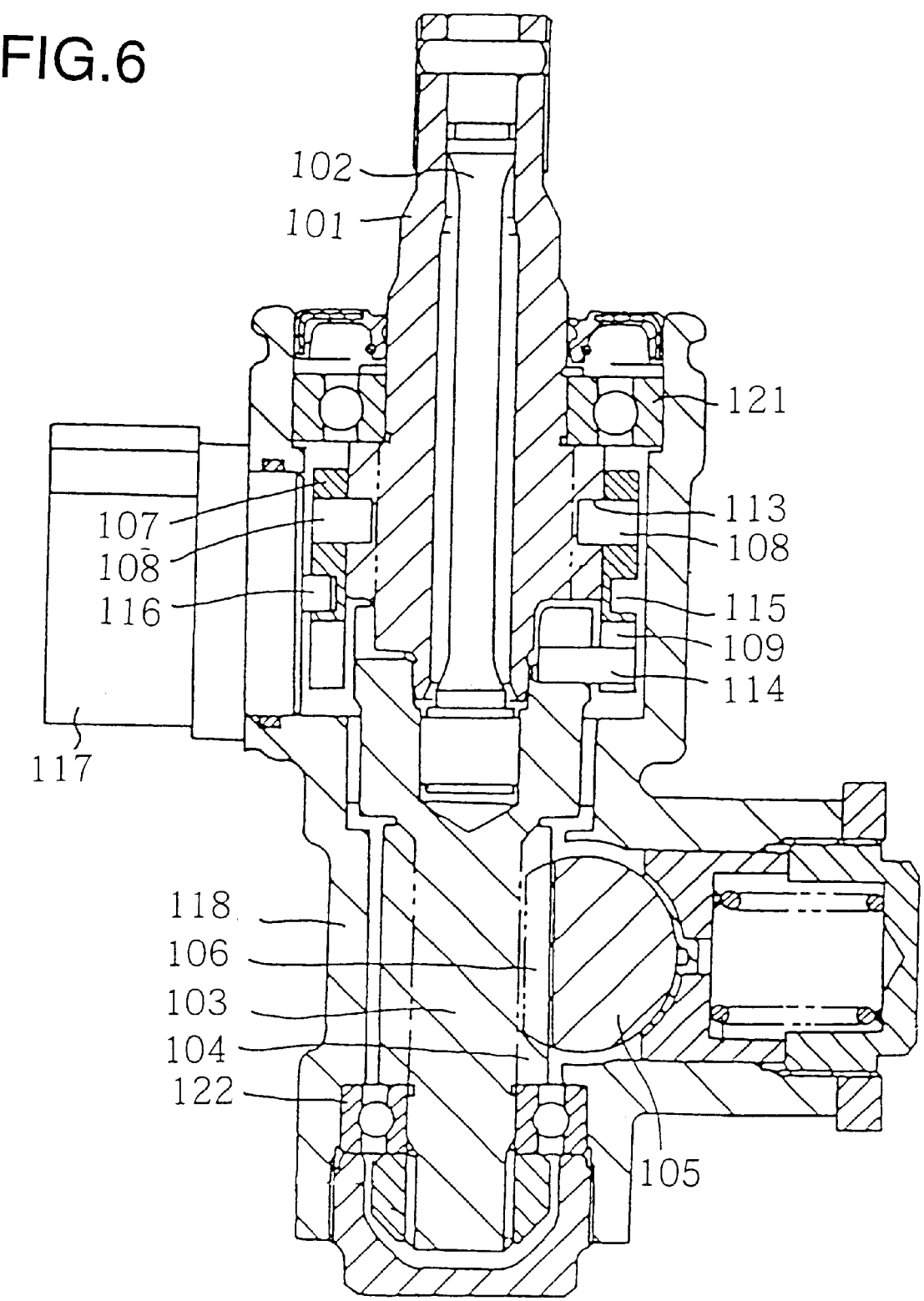
FIG. 6 is a sectional drawing of a conventional input torque detecting device.
Figure 7:
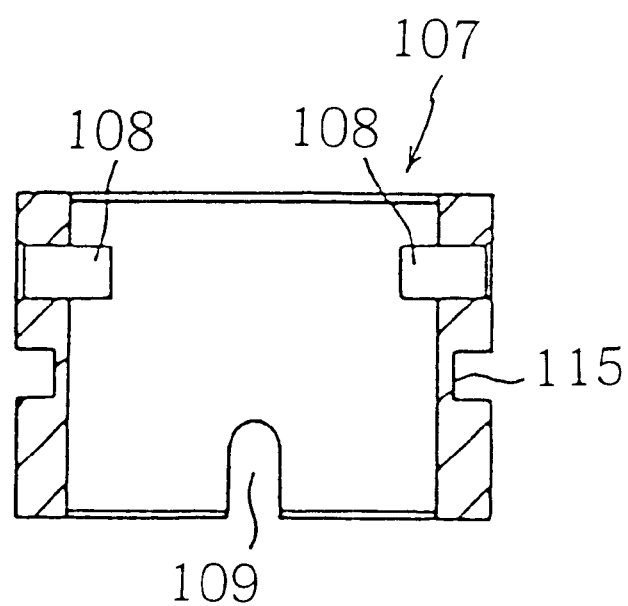
FIG. 7 is a sectional drawing of a sleeve of the conventional input torque detecting device.
Figure 8:
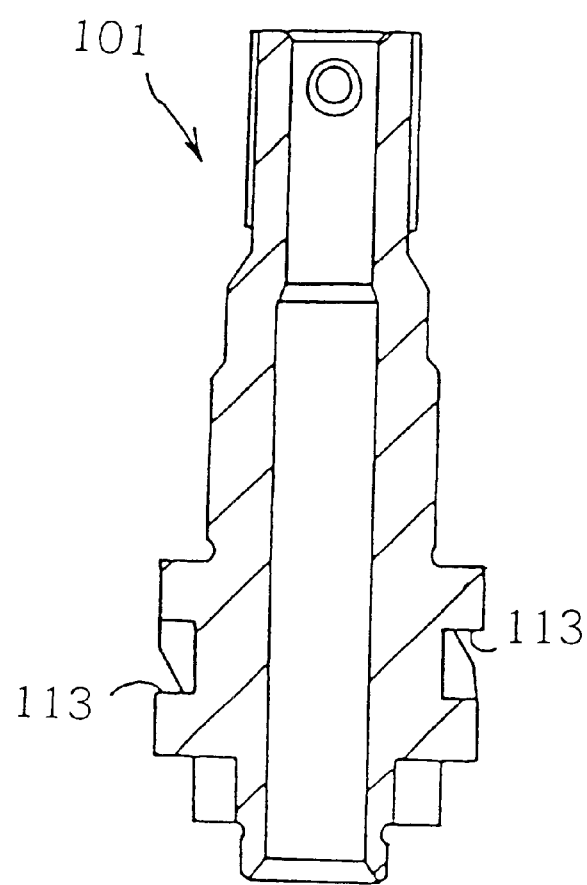
FIG. 8 is a sectional drawing of an input shaft of the conventional input torque detecting device.
Figure 9:
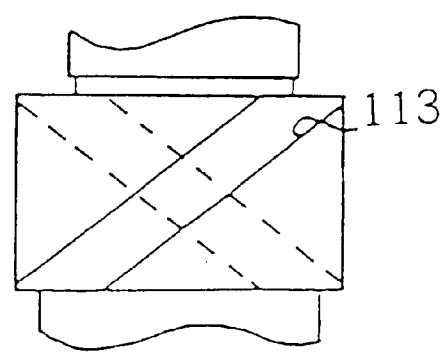
FIG. 9 shows a spline groove of the conventional input torque detecting device.

FIG. 5 is a section showing another embodiment according to the present invention. In this embodiment, the straight splines 9a and 9b which are sections of engaging the output shaft 3 with the sleeve 7 in the embodiment shown in FIG. 1 are exchanged with a hole 109 facing in the direction of a shaft line and a pin 114 of the conventional example shown in FIG. 6. In the input torque detecting device shown in FIG. 5, operation is same as that of the embodiment shown in FIG. 1 described above, and the helical splines 8a and 8b and the undulation section 15 bring results similar to the embodiment shown in FIG. 6. Thus, manufacturing of the device can be facilitated, costs can be decreased, and durability can be improved.

INDUSTRIAL APPLICABILITY

As described above, the input torque detecting device for power steering according to the present invention is useful as an input torque detecting device which converts torsion of the torsion bar based on input torque into an amount of slide in the direction of a shaft and detects it. In particular, it is suitable for decreasing manufacturing costs of the input torque detecting device, facilitating assembly, and improving durability.

What is claimed is:

1. An input torque detecting device for power steering, comprising:

an input shaft to which a torque is applied from a steering wheel side;

an output shaft for linking to a steering side, one of the input shaft and the output shaft having a section of enlarged diameter;

a torsion bar connecting the output shaft to the input shaft;

a cylindrical sleeve slidably disposed on the input shaft and the output shaft, the sleeve having an orthogonally projecting undulation in an outer circumference thereof;

a plurality of diagonal splines, formed at the section of enlarged diameter, and at an inner circumference of the sleeve, the diagonal splines extending in a direction diagonal to the axial direction, the diagonal splines at the section of enlarged diameter engaging with the diagonal splines at the inner circumference of the sleeve so as to convert relative rotation between the input shaft and the output shaft to a sliding motion of the sleeve in the axial direction;

means engaging one of the input shaft and the output shaft with the sleeve so as to restrict to the axial direction sliding movement of the sleeve with respect to the one of the input shaft and the output shaft; and means, including a detection lever engaged with the undulation, for detecting an amount of the sliding movement of the sleeve.

2. The input torque detecting device for power steering according to claim 1, wherein the engaging means includes a pair of first splines extending in the axial direction, the pair of first splines formed at an interval of 180 degrees at the outer circumference of either the input shaft or the output shaft and a pair of second splines extending in the axial direction at the inner circumference of the sleeve, in engagement with the pair of first splines, respectively.

3. The input torque detecting device for power steering according to claim 2, wherein the one of the input shaft and the output shaft having the section of enlarged diameter at which the diagonal splines are formed is a first section of enlarged diameter, wherein the other of the input shaft and the output shaft has a second section of enlarged diameter, wherein the pair of first splines is formed on the second section of enlarged diameter, and wherein one end of the pair of first splines is open.

4. The input torque detecting device for power steering according to claim 3, wherein the input shaft has a hollow section and said torsion bar is disposed within said hollow section.

5. The input torque detecting device for power steering according to claim 1, wherein at least one end of the diagonal splines is open.

6. An input torque detecting device for power steering, comprising:

an input shaft to which a torque is applied from a steering wheel side having a hollow section;

an output shaft for linking to a steering side, one of the input shaft and the output shaft having and section of enlarged diameter;

a torsion bar within the hollow section and connecting the output shaft to the input shaft;

a cylindrical sleeve slidably disposed on the input shaft and the output shaft, the sleeve having an orthogonally projecting undulation in an outer circumference thereof;

a plurality of diagonal splines, formed at the section of enlarged diameter, and at an inner circumference of the sleeve, the diagonal splines extending in a direction diagonal to the axial direction, and being open at an end thereof, the diagonal splines at the section of enlarged diameter engaging with the diagonal splines at the inner circumference of the sleeve so as to convert relative rotation between the input shaft and the output shaft to a sliding motion of the sleeve in the axial direction;

means engaging one of the input shaft and the output shaft with the sleeve so as to restrict to the axial direction sliding movement of the sleeve with respect to the one of the input shaft and the output shaft; and means, including a detection lever engaged with the undulation, for detecting an amount of the sliding movement of the sleeve.

7. The input torque detecting device for power steering according to claim 6, wherein the engaging means includes a pair of first splines extending in the axial direction, the pair of first splines formed at an interval of 180 degrees at the outer circumference of either the input shaft or the output shaft and a pair of second splines extending in the axial direction at the inner circumference of the sleeve, in engagement with the pair of first splines, respectively.

8. The input torque detecting device for power steering according to claim 7, wherein the one of the input shaft and the output shaft having the section of enlarged diameter at which the diagonal splines are formed is a first section of enlarged diameter, wherein the other of the input shaft and the output shaft has a second section of enlarged diameter, wherein the pair of first splines is formed on the second section of enlarged diameter, and wherein one end of the pair of first splines is open.

9. The input torque detecting device for power steering according to claim 6, wherein at least one end of the diagonal splines is open.

* * * * *